United States Patent
Kim (10) Patent No.: US 10,421,652 B2
(45) Date of Patent: Sep. 24, 2019

(54) RISE PREVENTION DEVICE FOR VEHICLE BODY AND VEHICLE ASSEMBLY SYSTEM INCLUDING THE SAME

(71) Applicants: Hyundai Motor Company, Seoul (KR); Kia Motors Corporation, Seoul (KR)

(72) Inventor: Jung Ho Kim, Chungcheongnam-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/019,857

(22) Filed: Jun. 27, 2018

(65) Prior Publication Data

US 2018/0312380 A1   Nov. 1, 2018

Related U.S. Application Data

(62) Division of application No. 14/568,427, filed on Dec. 12, 2014, now Pat. No. 10,053,345.

(30) Foreign Application Priority Data

Jul. 25, 2014   (KR) .................. 10-2014-0094812

(51) Int. Cl.
| | | |
|---|---|---|
| B23P 19/00 | (2006.01) | |
| B66F 7/28 | (2006.01) | |
| B62D 65/18 | (2006.01) | |
| B62D 65/12 | (2006.01) | |

(52) U.S. Cl.
CPC ................ B66F 7/28 (2013.01); B62D 65/18 (2013.01); B62D 65/12 (2013.01)

(58) Field of Classification Search
CPC ...... B66F 7/28; B66F 7/00; B23P 9/00; B23P 11/00; B23P 13/00
See application file for complete search history.

(56) References Cited

U.S. PATENT DOCUMENTS

| | | | |
|---|---|---|---|
| 4,750,712 A | 6/1988 | Genovese | |
| 5,855,359 A | 1/1999 | Chipperfield | |
| 6,059,263 A | 5/2000 | Otema et al. | |
| 10,053,345 B2* | 8/2018 | Kim .................... | B66F 7/28 |
| 2016/0023870 A1* | 1/2016 | Kim .................... | B66F 7/28 |
| | | | 29/559 |

(Continued)

FOREIGN PATENT DOCUMENTS

| | | |
|---|---|---|
| JP | 79685 | 2/1995 |
| JP | 8-104267 | 4/1996 |
| JP | 200589031 A | 4/2005 |

(Continued)

*Primary Examiner* — Lee D Wilson
(74) *Attorney, Agent, or Firm* — Mintz Levin Cohn Ferris Glovsky and Popeo, P.C.; Peter F. Corless (57) ABSTRACT

A rise prevention device for a vehicle body and a vehicle assembly system including the same are provided. The a rise prevention device for a vehicle body includes an elevation device that is configured to move up and down and a power base that is configured to move up and down on the elevation device. In addition, a pressing device is configured to move up and down, is supported by the power base and is configured to press against the vehicle body to prevent the vehicle body from rising.

4 Claims, 5 Drawing Sheets

(56) References Cited

U.S. PATENT DOCUMENTS

2018/0312380 A1* 11/2018 Kim .......................... B66F 7/28

FOREIGN PATENT DOCUMENTS

| | | |
|---|---|---|
| JP | 2005177926 A | 7/2005 |
| KR | 1999-0027708 | 7/1999 |
| KR | 10-2004-0089928 A | 10/2004 |
| KR | 10-0820427 B1 | 4/2008 |
| WO | 2009031379 A1 | 3/2009 |

* cited by examiner

FIG. 1

RELATED ART

RISE PREVENTION DEVICE FOR VEHICLE BODY AND VEHICLE ASSEMBLY SYSTEM INCLUDING THE SAME

CROSS-REFERENCE TO RELATED APPLICATION

This application is a Divisional Application of U.S. patent application Ser. No. 14/568,427 filed on Dec. 12, 2014 which claims the benefit of priority to Korean Patent Application No. 10-2014-0094812 filed Jul. 25, 2014, in the Korean Intellectual Property Office, the disclosure of which is incorporated herein in its entirety by reference.

TECHNICAL FIELD

The present disclosure relates to a rise prevention device for a vehicle body and a vehicle assembly system including the same, and more particularly, to a system for automatically preventing a vehicle body from rising during a rear suspension related connection operation of a vehicle.

BACKGROUND

Figure 1:
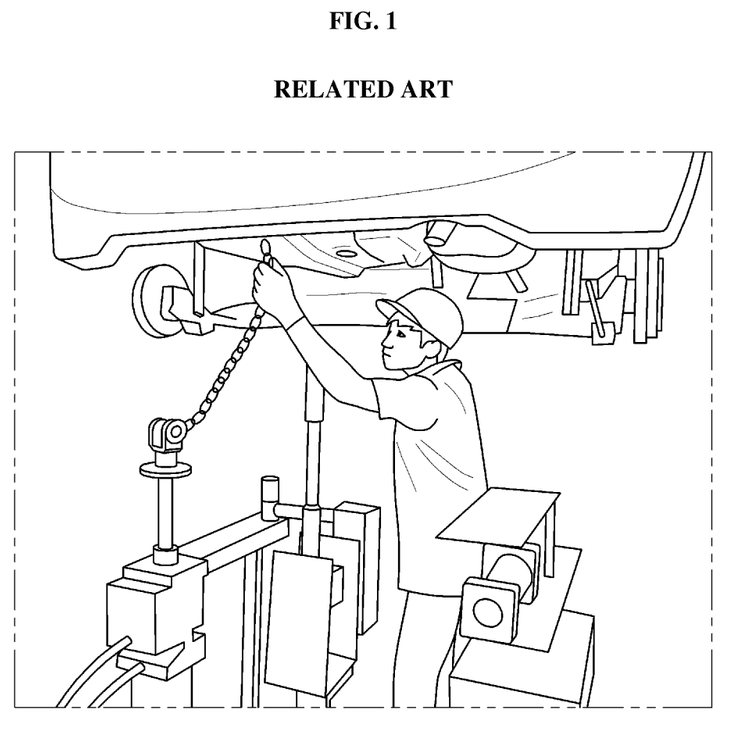
FIG. 1 illustrates an exemplary rise prevention method of a vehicle body according to the related art.

FIG. 1 illustrates an exemplary rise prevention method of a vehicle body according to the related art. Referring to FIG. 1, when a vehicle body is delivered through a conveyor suspended from a ceiling during assembly of a vehicle is assembled with a chassis, in particular, when a shock absorber configuring a rear suspension is mounted in the vehicle body, the vehicle body suspended from a hanger of the conveyor may be separated upward due to elasticity of a chassis spring, which may cause inconvenience of the operation.

Accordingly, during the mounting operation, the vehicle body is suspended by a chain 60 to prevent the vehicle body from separating due to a spring force, which requires two manual workers and may cause safety accidents during the operation, that is, safety accidents such as the rising of the vehicle body during a rupture of the chain 60 or the insertion omission of the chain 60 due to a mistake of the worker as a worker lifts the rear suspension and then inserts the chain 60 manually. Further, since all the operations of inserting the chain 60 are performed manually, the time required to perform the mounting operation increases and when the chain 60 is not stretched tight due to a difference in distance from the vehicle body in a common line, the vehicle body may rise and thus inconvenience of excessive concentration may be caused.

SUMMARY

The present disclosure provides an assembly system that prevents safety accidents by preventing a vehicle body from rising during the assembly of a rear suspension. Another aspect of the present disclosure automates a prevention of safety accidents.

However, technical problems of the present disclosure are not limited to the above-mentioned matters and other technical problems which are not mentioned may be clearly understood by those skilled in the art from the following descriptions.

According to an exemplary embodiment of the present disclosure, a rise prevention device for a vehicle body may include an elevation device configured to move up and down (e.g., vertically); a power base configured to move up and down (e.g., vertically), on the elevation device; and a pressing device configured to move up and down (e.g., vertically), supported by the power base and configured to press against a vehicle body to prevent the vehicle body from rising.

According to another exemplary embodiment of the present disclosure, a vehicle assembly system may include a vehicle transfer device configured to transfer the vehicle body; a rear suspension lifter configured to support a rear suspension of the transferred vehicle body; and a rise prevention device for a vehicle body configured to automatically ascend and descend against the vehicle body ascending by an elastic force of the rear suspension to prevent the vehicle body from rising.

Specific matters of another exemplary embodiment will be included in a detailed description and the accompanying drawings.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Advantages and features of the present disclosure and a method achieving them will be more obvious with reference to exemplary embodiments to be described below in detail with reference to the accompanying drawings. However, the present disclosure is not limited to exemplary embodiments disclosed herein but will be implemented in various forms. The exemplary embodiments make description of the present disclosure thorough and are provided so that those skilled in the art can easily understand the scope of the present disclosure. Therefore, the present disclosure will be defined by the scope of the appended claims. Like reference numerals throughout the specification denote like elements.

Hereinafter, a rise prevention device for a vehicle body and a vehicle assembly system including the same according to exemplary embodiments of the present disclosure will be described with reference to the accompanying drawings.

Figure 2:
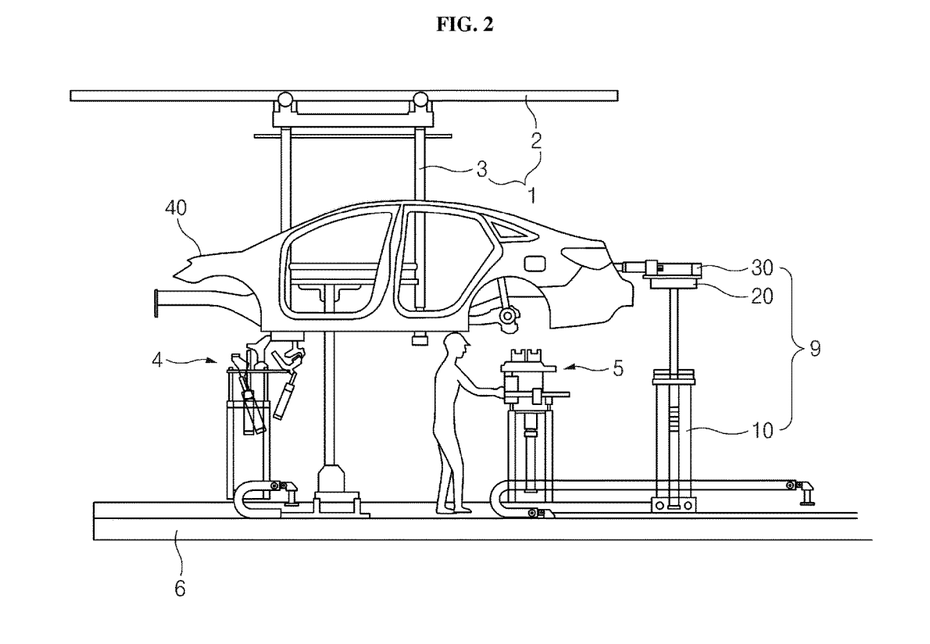
FIG. 2 is an exemplary diagram schematically illustrating a vehicle transfer device and a vehicle assembly system including the same according to an exemplary embodiment of the present disclosure.

FIG. 2 is an exemplary diagram schematically illustrating a vehicle transfer device 1 and a vehicle assembly system including the same according to an exemplary embodiment of the present disclosure. Referring to FIG. 2, the rise prevention device 9 for a vehicle body according to the exemplary embodiment of the present disclosure may include: an elevation device 10 configured to move up and down (e.g., vertically); a power base 20 configured to move up and down, on the elevation device 10; and a pressing device 30 configured to move up and down, supported by the power base 20 and press against (e.g., exert pressure against) a vehicle body 40 to prevent the vehicle body 40 from rising. The elevation device 10 may be configured to move vertically and may include an actuator. The actuator may be a motor. The elevation device 10 may include a rack and a pinion or may be operated by a hydraulic method. The power base 20 may be configured to move vertically by the elevation device 10. The power base 20 may be configured to support the pressing device 30 and the power base 20 may be supported by the elevation device 10. The pressing device 30 may be configured to move vertically by the power base 20 (e.g., by the movement of the power base 20). The pressing device 30 may be configured to press against the vehicle body 40. The vehicle body 40 may be upwardly applied with a force by a rear suppression lifter. The pressing device 30 may be configured to downwardly apply a force to the vehicle body 40 to prevent the vehicle body 40 from rising.

Figure 3:
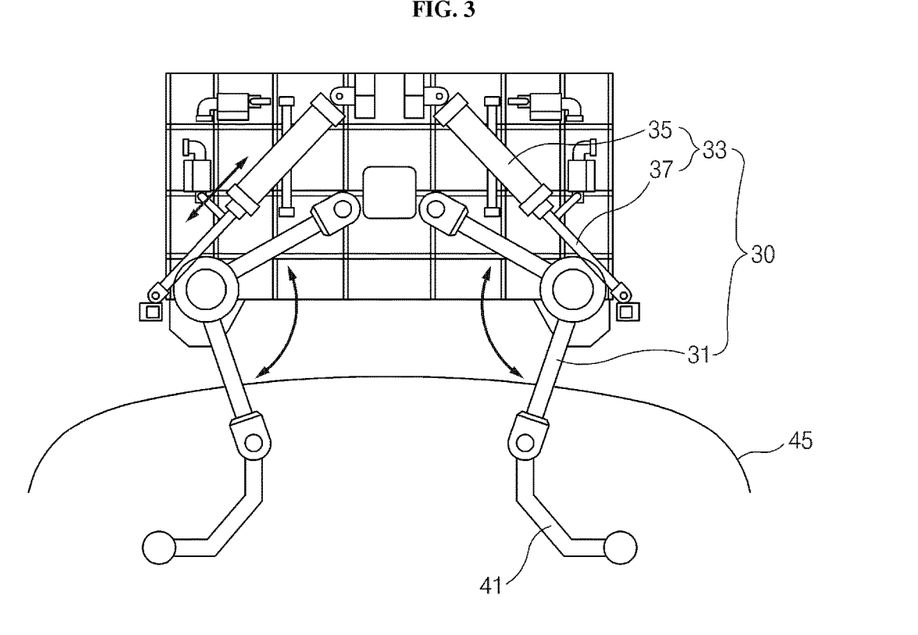
FIG. 3 is an exemplary plan view illustrating a movement of a pressing device according to an exemplary embodiment of the present disclosure.
Figure 4:
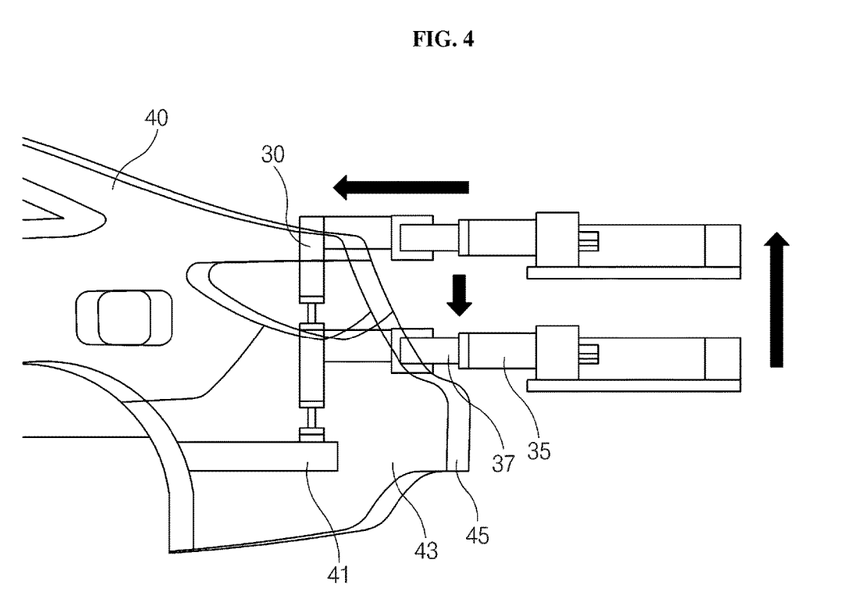
FIG. 4 is an exemplary side view illustrating the movement of the pressing device according to the exemplary embodiment of the present disclosure.

FIG. 3 is an exemplary plan view illustrating a movement of the pressing device 30 according to an exemplary embodiment of the present disclosure. FIG. 4 is an exemplary side view illustrating the movement of the pressing device 30 according to the exemplary embodiment of the present disclosure. Referring to FIGS. 3 and 4, the pressing device 30 may include a pressing part 31 configured to move horizontally to press the vehicle body 40 and a support part 33 configured to movably support the pressing part 31. The pressing part 31 may be configured to move toward an inside of the vehicle body 40 and may move toward a trunk 43 of the vehicle. The pressing part 31 may also be configured to move toward a vehicle interior. The pressing part 31 may be configured to move horizontally.

The pressing part 31 may be pivotably coupled, rotatably coupled, or hinge-coupled with the support part 33. The pressing part 31 may be configured to rotate toward an inside of the vehicle body 40. The support part 33 may be extendedly formed longitudinally. The support part 33 may be formed to be advanced and retreated toward the vehicle body 40, that is, to extend and retract toward the vehicle body 40. Additionally, the support part 33 may be configured to adjust an interval from the vehicle body 40 and adjust an interval between the pressing part 31 and the vehicle body 40. The support part 33 is further configured to move the pressing part 31 to prevent the vehicle body 40 from colliding with the pressing part 31. The support part 33 may include a cylinder 35 which extends horizontally and may have an inside provided with a hollow and a piston 37 configured to be movably inserted into the cylinder 35 and connected to the pressing part 31. The cylinder 35 may be a hollow tube shape and may form a space in which oil flows. In addition, cylinder 35 may form a space in which the piston 37 may move.

The piston 37 may be guided by the cylinder 35 to move in a length direction of the cylinder 35. In addition, the piston 37 may be connected to the pressing part 31 and move along with the pressing part 31 to adjust a distance between the pressing part 31 and a bumper 45. The piston 37 may be moved by an oil pressure. Further, the elevation device 10 may be configured to descend when the pressing part 31 enters the vehicle body 40 and may stop ascending when the pressing part 31 ascends to a higher position than the bumper 45. The elevation device 10 may then be configured to ascend until the bumper 45 is beyond a rotating radius of the pressing part 31. In particular, the elevation device 10 may be configured to descend when the pressing part 31 is positioned at an upper portion of the vehicle body 40 and descend when the pressing part 31 is positioned at the upper portion of the trunk 43.

The pressing part 31 may be formed in plural (e.g., a plurality of pressing parts 31) to press against left and right portions of the vehicle body 40, respectively or to press against multiple points of the vehicle body 40. The pressing part 31 may also be formed in one pressing part 31 to press against a substantially central portion of the vehicle body 40. However, for balance of the vehicle body 40 and working stability, the pressing part 31 may be configured to press against both sides of the vehicle body based on a center of the vehicle body 40. In particular, the pressing part 31 may be configured to downwardly press against side members 41 of the vehicle body 40 or the side members 41 which are positioned in the trunk 43. Accordingly, pressing part 31 may be configured to press against upper ends of the side members 41 to prevent the side members 41 from rising.

The rise prevention device 9 for a vehicle body according to the exemplary embodiment of the present disclosure may include a bumper sensor 51 configured to sense interference between the pressing device 30 and the bumper 45 of the vehicle. The bumper sensor 51 may be configured to sense a distance from a rear bumper 45. A controller 50 may be configured to receive information from the bumper sensor 51 to prevent the pressing device 30 from colliding with the bumper 45 or the pressing device 30 from colliding with the vehicle body 40. The controller 50 may also be configured to prevent the vehicle body 40 and the bumper 45 from colliding with the pressing device 30 using the bumper sensor 51. To prevent the vehicle body 40 and the bumper 45 from colliding with the pressing device 30, the controller 50 may be configured to operate the pressing part 31 and the support part 33.

The rise prevention device 9 for a vehicle body according to the exemplary embodiment of the present disclosure may include a position sensor 53 configured to sense a degree of rotation of the pressing part 31 and a position of the pressing part 31. The position sensor 53 may further be configured to sense whether the pressing part 31 rotates in a direction of the vehicle body 40 and whether the pressing part 31 rotates to some extent during rotating.

Furthermore, position sensor 53 may be configured to sense whether the pressing part 31 rotates in a distant direction from the vehicle body 40, that is, whether the pressing part 31 rotates toward a rear of the vehicle body 40. The pressing part 31 may also be configured to maintain a maximally folded state to prevent a collision with the bumper 45 and the vehicle body 40 when the elevation device 10 is driven. The position sensor 53 may be configured to sense whether the pressing part 31 is in the maximally folded state. The controller 50 may be configured to prevent the vehicle body 40 and the bumper 45 from colliding with the pressing device 30 using the position sensor 53. The rise prevention device 9 may also include an advance sensor 55 configured to sense how much the support part 33 moves horizontally (e.g., a horizontal distance measurement) and how much the piston 37 moves (e.g., a movement measurement of the piston 37). In particular, advance sensor 55 may be configured to sense whether the piston 37 moves in a direction of the vehicle body 40, and how much the piston 37 moves. The controller 50 may be configured to prevent the vehicle body 40 and the bumper 45 from colliding with the pressing device 30 using the advance sensor 55.

FIG. 2 is an exemplary diagram schematically illustrating a vehicle transfer device 1 and a vehicle assembly system including the same according to an exemplary embodiment of the present disclosure. Referring to FIG. 2, a vehicle assembly system according to the exemplary embodiment of the present disclosure may include: the vehicle transfer device 1 configured to transfer the vehicle body 40; the rear suspension lifter 5 configured to support the rear suspension of the transferred vehicle body 40; and the rise prevention device 9 for a vehicle body configured to automatically ascend an descend and press against the vehicle body 40 ascending by an elastic force of the rear suspension to prevent the vehicle body 40 from rising. In addition, the vehicle assembly system according to the exemplary embodiment of the present disclosure may include the vehicle transfer device 1 configured to transfer a hanger 3 loaded with the vehicle body 40 to an assembly platform 6 along a transfer rail 2 arranged on a ceiling and a clamping device mounted on a frame configuring the vehicle transfer device 1 to hold and fix the hanger 3 positioned at the assembly platform 6 using the vehicle transfer device 1.

The vehicle body 40 may be manufactured by performing a part assembly operation of the vehicle body including painting while moving in which the vehicle body is attached to the hanger 3 for delivery of a conveyor (EMS, P & F, friction) suspended from a ceiling. The conveyor may generally include the hanger 3 configured to move along the conveyor rail locked to (e.g., fixed to) the chain 60 moving by a roller to deliver the vehicle body 40 and the stopping of the hanger 3 may be operated by a rail brake mounted in the conveyor to hold the hanger 3 delivering the vehicle body 40. Accordingly, when the vehicle body 40 transferred through the conveyor suspended from the ceiling is assembled with a chassis, in particular, when the shock absorber configuring the rear suspension is mounted in the vehicle body 40, the vehicle body 40 suspended from the hanger 3 of the conveyor may be vertically applied with a force due to the elasticity of the chassis spring.

The clamping device 4 of the hanger 3 may include a clamp configured to restrict the motion of the hanger 3 positioned in the assembly platform 6 through the vehicle transfer device 1, which uses a general structure configured to hold and fix a portion of the hanger 3, that is, a method for fixing a portion of the hanger 3 by folding and unfolding the hanger 3 to both sides using the pneumatic cylinder 35. The rear suspension lifter 5 may be configured to lift the rear suspension of the vehicle body 40. The vehicle body 40 may be configured to rise by the elastic force of the rear suspension. The rise prevention device for the vehicle body 40 may be configured to apply a force in an opposite direction to the elastic force of the rear suspension to prevent the vehicle body 40 from rising.

The rise prevention device 9 for a vehicle body may include: the elevation device 10 configured to move up and down; the power base 20 configured to move up and down on the elevation device 10; and the pressing device 30 configured to move up and down, supported by the power base 20 and configured to press against the vehicle body 40 to prevent the vehicle body 40 from rising. The elevation device 10 may be configured to move vertically and may include the actuator which may be a motor. The elevation device 10 may be a rack and a pinion or may be operated by a hydraulic method.

The power base 20 may be configured to move up and down by the elevation device 10 and may be configured to support the pressing device 30. The power base 20 may be supported by the elevation device 10. Additionally, pressing device 30 may be configured to move up and down by the power base 20 and may press against the vehicle body 40. The vehicle body 40 may then be upwardly applied with a force by the rear suppression lifter. In addition, the pressing device 30 may be configured to downwardly apply a force to the vehicle body 40 to prevent the vehicle body 40 from rising.

Figure 5:
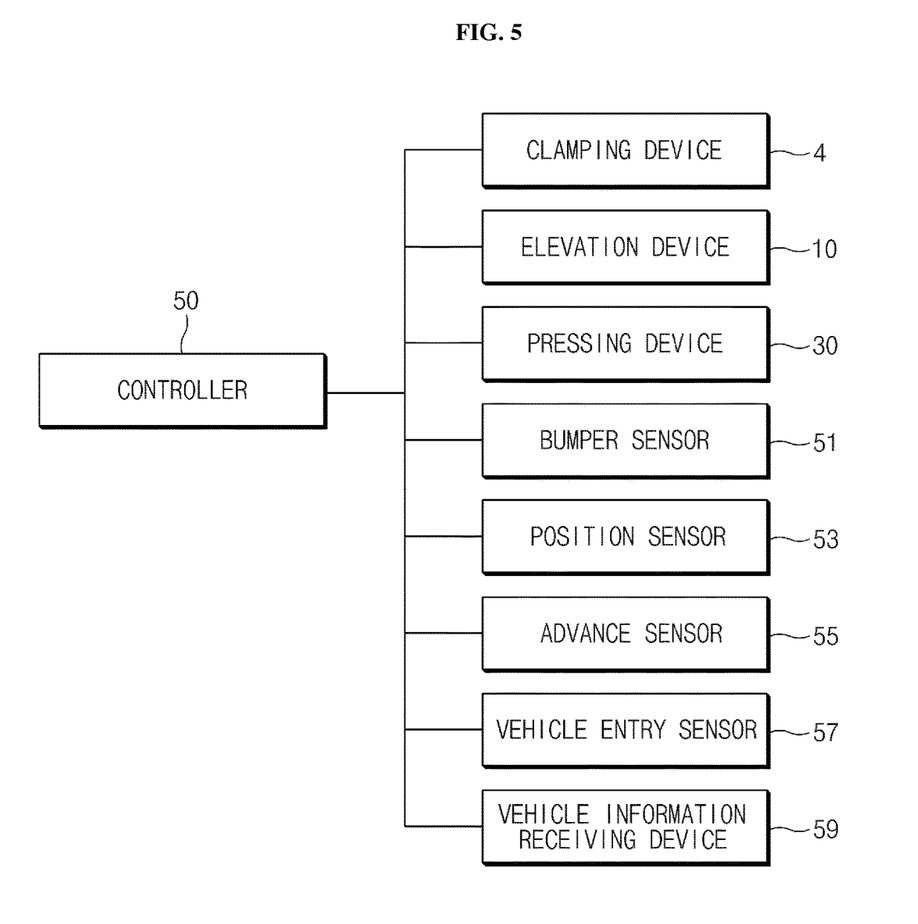
FIG. 5 is an exemplary block diagram illustrating the vehicle transfer device and the vehicle assembly system including the same according to an exemplary embodiment of the present disclosure.

FIG. 5 is an exemplary block diagram illustrating the vehicle transfer device 1 and the vehicle assembly system including the same according to an exemplary embodiment of the present disclosure. Referring to FIG. 5, the vehicle assembly system according to the exemplary embodiment of the present disclosure may include the controller 50 configured to operate the elevation device 10 when the rear suspension lifter lifts the vehicle body 40 to lift the pressing device 30 and move the elevation device 10 downward (e.g., descend) when the pressing device 30 moves into the vehicle body 40. The controller 50 may use a computer or may be a typically used programmable ladder logic (PLC) controller.

The controller 50 may be configured to use a vehicle entry sensor to determine whether the vehicle body 40 enters the assembly platform 6. When the vehicle body 40 moves to the assembly platform 6, the controller 50 may be configured to operate the elevation device 10. The controller 50 may then be configured to receive information from the bumper sensor 51, the advance sensor 55, and the position sensor 53. The controller 50 may be configured to maximally space the support part 33 and the pressing part 31 from the vehicle body 40 and the bumper 45 to prevent the pressing device 30 from colliding with the vehicle body 40 and the bumper 45 during the driving of the elevation device 10. Since the pressing part 31 may rotate, the controller 50 may be configured to rotate the pressing part 31 in a distant direction from the vehicle body 40. Since the support part 33 may move horizontally, the controller 50 may be configured to adjust an oil pressure to maximally insert the piston 37 into the cylinder 35.

The vehicle assembly system according to the exemplary embodiment of the present disclosure may include a vehicle information receiving device 59 configured to receive vehicle information and the controller 50 may be configured to operate the pressing device 30 based on the information input from the vehicle information receiving device 59. The vehicle information receiving device 59 may configured to automatically or manually receive the information of the vehicle body 40. The vehicle information receiving device 59 may be configured to transfer the information of the vehicle body 40 to the controller 50. The controller 50 may be configured to operate the pressing device 30 based on the received information. Additionally, a size of the vehicle body 40 and the position of the side member 41 may differ based on a vehicle model. Therefore, the controller 50 may be configured to operate the support part 33 and the pressing part 31 based on the position of the bumper 45 and the position of the side member 41 which correspond to a vehicle model.

As described above, according to the exemplary embodiment of the present disclosure, since the rear suspension mounting operation may be performed when the hanger 3 on which the vehicle body 40 is attached is fixed while preventing the vehicle body 40 from rising by pressing against the vehicle body 40 when the vehicle body 40 transferred to the vehicle assembly system mounting the rear suspension using the hanger 3 is entered thereinto, it may be possible to completely prevent the vehicle body 40 from rising due to the strong elasticity of the chassis spring when the rear suspension is mounted in the vehicle body 40 suspended from the hanger 3.

Further, according to the exemplary embodiment of the present disclosure, since the rear suspension may be mounted when the vehicle body 40 on the hanger 3 is fixed, the worker need not perform the fixing operation of the vehicle body 40 and thus may conveniently perform the operation and since the worker need not perform the operation manually using the chain 60, and the like, it may be possible to prevent safety accidents during the mounting of the rear suspension. As described above, according to the exemplary embodiments of the present disclosure, the following effects may be obtained.

First, it may be possible to prevent the safety accidents by disposing the pressing device for the vehicle body.

Second, it may be possible to improve the operation efficiency and increase the operation speed by allowing the worker to be concerned only about the assembling of the vehicle.

However, the effects of the present disclosure are not limited to the above-mentioned effects and other effects which are not mentioned can be clearly understood to those skilled in the art from claims.

Although exemplary embodiments of the present disclosure have been shown and described hereinabove, the present disclosure is not limited to exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A vehicle assembly system, comprising:
    a vehicle transfer device configured to transfer a vehicle body;
    a rear suspension lifter configured to support a rear suspension of the transferred vehicle body; and
    a rise prevention device for a vehicle body configured to automatically ascend and descend and press against the vehicle body ascending by an elastic force of the rear suspension to prevent the vehicle body from rising.

2. The vehicle assembly system according to claim 1, wherein the rise prevention device for a vehicle body includes:
    an elevation device configured to move up and down;
    a power base configured to move up and down on the elevation device; and
    a pressing device configured to move up and down, supported by the power base and configured to press against the vehicle body to prevent the vehicle body from rising.

3. The vehicle assembly system according to claim 2, further comprising:
    a controller configured to operate the elevation device when the rear suspension lifter lifts the vehicle body to lift the pressing device and lower the elevation device when the pressing device moves into the vehicle body.

4. The vehicle assembly system according to claim 3, wherein the controller is configured to operate the pressing device based on information received regarding vehicle information.

* * * * *